(12) United States Patent
Li et al.

(10) Patent No.: US 11,904,728 B2
(45) Date of Patent: Feb. 20, 2024

(54) THERMAL MANAGEMENT SYSTEM FOR BATTERY PACK AND THERMAL MANAGEMENT SYSTEM FOR ELECTRIC VEHICLE

(71) Applicant: Contemporary Amperex Technology Co., Limited, Ningde (CN)

(72) Inventors: Yanru Li, Ningde (CN); Xingyuan Wu, Ningde (CN); Guowei Li, Ningde (CN); Wei Zhang, Ningde (CN); Zhimin Dan, Ningde (CN); Xiyang Zuo, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 356 days.

(21) Appl. No.: 17/458,640

(22) Filed: Aug. 27, 2021

(65) Prior Publication Data

US 2021/0387548 A1 Dec. 16, 2021

Related U.S. Application Data

(63) Continuation of application No. PCT/CN2020/075861, filed on Feb. 19, 2020.

(30) Foreign Application Priority Data

Feb. 28, 2019 (CN) .......................... 201910152153.0

(51) Int. Cl.
*H01M 10/6568* (2014.01)
*B60L 58/26* (2019.01)
*B60H 1/00* (2006.01)
*H01M 10/6563* (2014.01)

(52) U.S. Cl.
CPC .......... *B60L 58/26* (2019.02); *B60H 1/00392* (2013.01); *B60H 1/00485* (2013.01); *H01M 10/6568* (2015.04); *H01M 10/6563* (2015.04)

(58) Field of Classification Search
CPC ............... B60L 58/26; B60L 2240/425; B60L 2240/34; B60L 2240/36; B60L 2240/545; B60L 58/27; B60H 1/00392; B60H 1/00485; B60H 2001/00307; B60H 1/00278; H01M 10/6568; H01M 10/6563; H01M 2220/20; H01M 10/613; H01M 10/615; H01M 10/625; H01M 10/635; H01M 10/663; H01M 10/667; H01M 10/6554; H01M 10/6567; H01M 10/66; B60K 2001/005; B60K 1/04; B60K 1/00; B60K 2001/006; Y02T 10/64; Y02T 10/70; Y02E 60/10

See application file for complete search history.

(56) References Cited

U.S. PATENT DOCUMENTS

| 9,680,190 B1* | 6/2017 | Xia ................... H01M 10/6557 |
| 2013/0022888 A1 | 1/2013 | Vollmer et al. |
| 2018/0006347 A1 | 1/2018 | Porras et al. |
| 2018/0178615 A1* | 6/2018 | Xia ..................... H01M 10/486 |
| 2020/0031250 A1* | 1/2020 | Yuan ................... H01M 10/663 |

FOREIGN PATENT DOCUMENTS

| CN | 104934653 A | 9/2015 |
| CN | 103887578 B | 3/2016 |
| CN | 105655667 A | 6/2016 |
| CN | 106143053 A | 11/2016 |
| CN | 106985657 A | 7/2017 |
| CN | 107097664 A | 8/2017 |
| CN | 107554235 A | 1/2018 |
| CN | 107914538 A | 4/2018 |
| CN | 207265191 U | 4/2018 |
| CN | 108099544 A | 6/2018 |
| CN | 108387023 A | 8/2018 |
| CN | 108501658 A | 9/2018 |
| CN | 108539327 A | 9/2018 |
| CN | 207842707 U | 9/2018 |
| CN | 106183789 B | 11/2018 |
| CN | 108987852 A | 12/2018 |
| CN | 109037831 A | 12/2018 |
| CN | 109367438 A | 2/2019 |
| JP | 2018124021 A | 8/2018 |

OTHER PUBLICATIONS

Communication pursuant to Article 94(3) EPC for European Application No. 20762930.4, dated Oct. 27, 2022, 3 pages.
Extended European search report for EP Application No. 20762930.4, dated Mar. 14, 2022, 10 pages.
International search report for PCT Application No. PCT/CN2020/075861, dated May 19, 2020, 8 pages.
First Office Action for China Application No. 201910152153.0, dated Jan. 19, 2021, 7 pages.
Notification Grant Action for China Application No. 201910152153.0, dated May 8, 2021, 6 pages.

* cited by examiner

*Primary Examiner* — Muhammad S Siddiquee
(74) *Attorney, Agent, or Firm* — East IP P.C.

(57) ABSTRACT

This application discloses a thermal management system for a battery pack and a thermal management system for an electric vehicle. the thermal management system for the battery pack includes: a thermal management device for the battery pack, a processor, and a solenoid valve network connected to the thermal management device for the battery pack. An external port of the solenoid valve network is connected to an external cooling system. The processor is configured to control operating status of a solenoid valve in the solenoid valve network, so that the thermal management device for the battery pack heats the battery pack by using heat generated by the external cooling system.

9 Claims, 2 Drawing Sheets

THERMAL MANAGEMENT SYSTEM FOR BATTERY PACK AND THERMAL MANAGEMENT SYSTEM FOR ELECTRIC VEHICLE

CROSS-REFERENCE TO RELATED APPLICATIONS

This application is a continuation of International Application No. PCT/CN2020/075861, filed on Feb. 19, 2020, which claims priority to Chinese Patent Application No. 201910152153.0, filed on Feb. 28, 2019 and entitled "THERMAL MANAGEMENT SYSTEM FOR BATTERY PACK AND THERMAL MANAGEMENT SYSTEM FOR ELECTRIC VEHICLE", both of which are incorporated herein by reference in their entireties.

TECHNICAL FIELD

This application relates to the field of new energy, and in particular, to a thermal management system for a battery pack and a thermal management system for an electric vehicle.

BACKGROUND

Intelligent and electric vehicles are one of important trends in the development of intelligent transportation. Especially in the field of electrification, an energy density of a battery pack is increasing with the advancement of materials and technology, and different means of transport are using a variety of battery packs as an energy source. Compared with conventional means of transport that mainly use fossil fuels as an energy source, modern means of transport increasingly use battery packs such as lithium batteries as an energy source.

In a battery electric vehicle, a thermal management system includes three main parts: thermal management for a passenger compartment, thermal management for a battery pack, and thermal management for an electric motor and an electric motor drive system. Because temperature requirements vary between the three parts, currently the three parts are generally independent of each other and scarcely integrated, resulting in serious heat waste and low energy utilization.

SUMMARY

Embodiments of this application provide a thermal management system for a battery pack and a thermal management system for an electric vehicle.

According to an aspect of this application, a thermal management system for a battery pack is provided. The system includes:

a thermal management device for the battery pack, a processor, and a solenoid valve network connected to the thermal management device for the battery pack.

An external port of the solenoid valve network is connected to an external cooling system.

The processor is configured to control operating status of a solenoid valve in the solenoid valve network, so that the thermal management device for the battery pack heats the battery pack by using heat generated by the external cooling system.

According to another aspect of this application, a thermal management system for an electric vehicle is provided. The system includes an external cooling system and the thermal management system for the battery pack according to an embodiment of this application.

DESCRIPTION OF DRAWINGS

The following describes features, advantages, and technical effects of exemplary embodiments of this application with reference to accompanying drawings.

DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

It needs to be noted that the relational terms herein such as first and second are used only to differentiate an entity or operation from another entity or operation, and do not require or imply any actual relationship or sequence between the entities or operations. Moreover, the terms "include", "comprise", and any variation thereof are intended to cover such a non-exclusive inclusion that a process, method, object, or device that includes or comprises a series of elements not only includes such elements, but also includes other elements not expressly specified or includes inherent elements of the process, method, object, or device. Unless otherwise specified in the context, reference to a process, method, object, or device that "includes" or "comprises" a specific number of elements does not exclude other equivalent elements existent in the process, method, object, or device.

Firstly, the following describes in detail a thermal management system 1 for a battery pack according to an embodiment of this application with reference to accompanying drawings.

Figure 1:
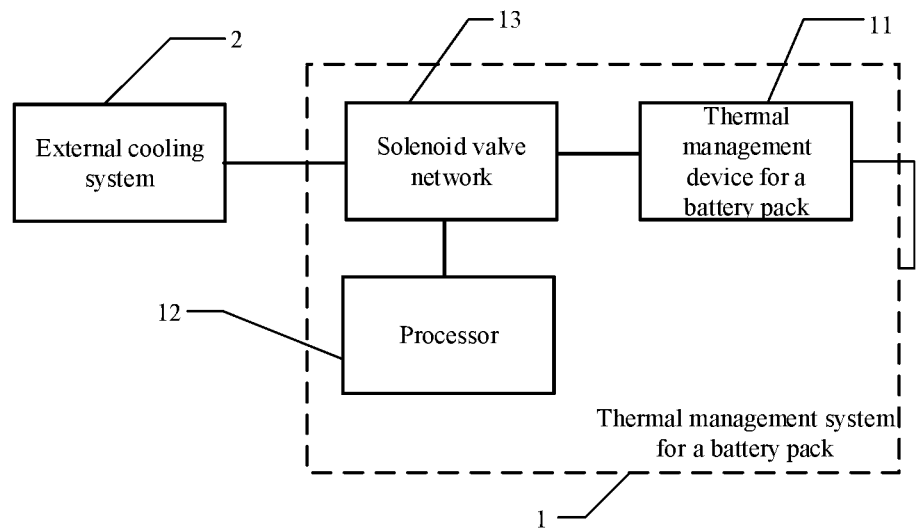
FIG. 1 is a schematic structural diagram of a thermal management system for a battery pack according to some embodiments of this application.

FIG. 1 is a schematic structural diagram of a thermal management system 1 for a battery pack according to some embodiments of this application. As shown in FIG. 1, the thermal management device 1 for the battery pack includes a thermal management device 11 for the battery pack, a processor 12, and a solenoid valve network 13 connected to the thermal management device 11 for the battery pack.

An external port of the solenoid valve network 13 is connected to an external cooling system 2.

In this embodiment of this application, the processor 12 is connected to the solenoid valve network 13, and is configured to control operating status of a solenoid valve in the solenoid valve network 13, so that the thermal management device 11 for the battery pack heats the battery pack by using heat generated by the external cooling system 2.

In this embodiment of this application, the external cooling system 2 includes a device capable of generating heat and a device for transferring heat. The heat generated by the external cooling system 2 may be waste heat generated by the device capable of generating heat in the external cooling system 2.

For example, the external cooling system 2 may be a brake cooling system in a vehicle, an engine cooling system in a hybrid electric vehicle, an electric motor and control cooling system in an electric vehicle, or other systems. The external cooling system is not limited herein. Using the electric motor and control cooling system as an example, devices capable of generating heat in the electric motor and control cooling system are an electric motor and an electric control device, and devices configured to transfer the waste heat generated by the electric motor and the electric control device include a coolant pipe and a cooler.

In this embodiment of this application, the operating status of the solenoid valve in the solenoid valve network 13 is controlled to achieve communication between the external cooling system 2 and the thermal management system 1 for the battery pack. In this way, the thermal management system 1 for the battery pack heats the battery pack by using the waste heat generated by the external cooling system 2, thereby sufficiently utilizing energy, reducing energy waste, and improving energy utilization.

Figure 2:
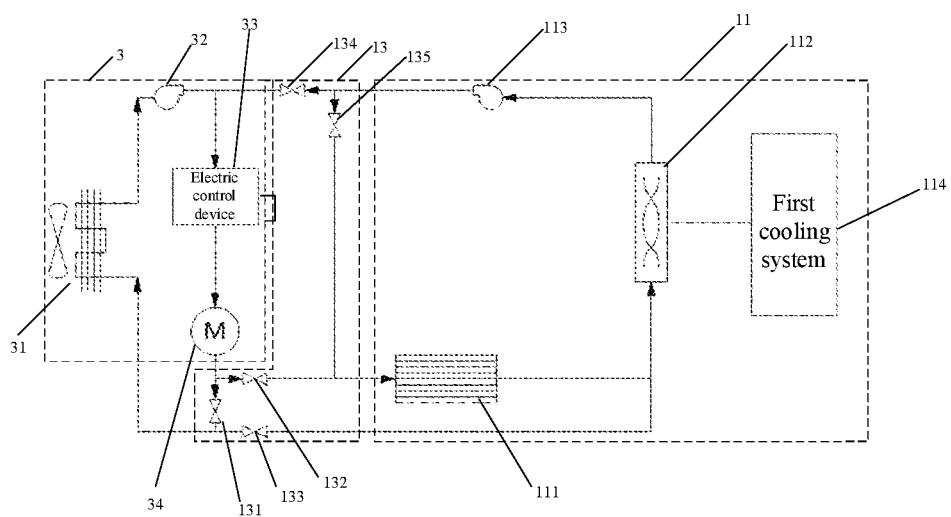
FIG. 2 is a schematic structural diagram of a thermal management system for a battery pack according to other embodiments of this application.

FIG. 2 is a schematic structural diagram of a thermal management system 1 for a battery pack according to an exemplary embodiment of this application. FIG. 2 shows a structure of the thermal management device 11 for a battery pack and a structure of the solenoid valve network 13.

Referring to FIG. 2, the solenoid valve network 13 includes: a first solenoid valve 131, a second solenoid valve 132, a third solenoid valve 133, a fourth solenoid valve 134, and a fifth solenoid valve 135.

A first valve port of the first solenoid valve 131 and a second valve port of the first solenoid valve 131 are both connected to the external cooling system 2. A first valve port of the second solenoid valve 132 is connected to the first valve port of the first solenoid valve 131, and a second valve port of the second solenoid valve 132 is connected to the thermal management module for the battery pack. A first valve port of the third solenoid valve 133 is connected to the second valve port of the first solenoid valve 131, and a second valve port of the third solenoid valve 133 is connected to the thermal management module for the battery pack. With respect to the fourth solenoid valve 134, a first valve port of the fourth solenoid valve 134 is connected to the external cooling system 2, and a second valve port of the fourth solenoid valve 134 is connected to a first valve port of a fifth solenoid valve 135 and the thermal management module for the battery pack. With respect to the fifth solenoid valve 135, a second valve port of the fifth solenoid valve 135 is connected to the second valve port of the second solenoid valve 132.

The external port of the solenoid valve network 13 includes the first valve port of the first solenoid valve 131, the second valve port of the first solenoid valve 131, and the first valve port of the fourth solenoid valve 134.

In this embodiment of this application, the specific form of each solenoid valve in the solenoid valve network 13 is not limited, and the specific form of the solenoid valve network 13 is not limited either.

Referring to FIG. 2, in some examples, the thermal management device 11 for the battery pack includes a first heat exchanger 111, a second heat exchanger 112, a first water pump 113 and a first cooling system 114. A first end of the first heat exchanger 111 is connected to the second valve port of the second solenoid valve 132, and a second end of the first heat exchanger 111 is connected to a first end of a second heat exchanger 112 and the second valve port of the third solenoid valve 133. A second end of the second heat exchanger 112 is connected to a first end of the first water pump 113, and a second end of the first water pump 113 is connected to the second valve port of the fourth solenoid valve 134. The first cooling system 114 is connected to the second heat exchanger 112 and is configured to absorb heat transferred by the second heat exchanger 112, so as to cool the battery pack.

In some examples, the first heat exchanger 111 is a plate heat exchanger. When a coolant flows through the plate heat exchanger, the battery pack and the coolant can exchange heat through the plate heat exchanger to implement heating or cooling for the battery pack. For example, the plate heat exchanger may be disposed at a bottom of the battery pack. A position relationship between the first heat exchanger 111 and the battery pack is not limited.

In some embodiments, the external cooling system 2 may be an electric motor and control cooling system 3. The electric motor and control cooling system 3 includes a cooler 31, a second water pump 32, an electric control device 33, and an electric motor 34. The electric control device 33 is a driving device for the electric motor 34.

The first valve port of the first solenoid valve 131 is connected to the first end of the electric motor 34, and the second end of the electric motor 34 is connected to the first end of the electric control device 33. The second valve port of the first solenoid valve 131 is connected to an inlet of the cooler 31, and an outlet of the cooler 31 is connected to a first end of the second water pump 32. The first valve port of the fourth solenoid valve 134 is connected to a second end of the second water pump 32 and a second end of the electric control device 33. The second end of the second water pump 32 is connected to the second end of the electric control device 33.

In this embodiment of this application, the external cooling system 2 may also be another system capable of generating heat and different from the electric motor and control cooling system 3 in the electric vehicle, and is not limited herein.

In this embodiment of this application, the operating status of the solenoid valve in the solenoid valve network 13, the operating status of the first water pump 113, and the operating status of the second water pump 32 are controlled to meet a variety of thermal management requirements of the electric motor and control cooling system 3 and the thermal management system 1 for the battery pack.

In this embodiment of this application, a cooling need of the electric motor 34 and the electric control device 33 may be determined according to a temperature of the electric motor 34 and a temperature of the electric control device 33. For example, the processor 12 may obtain the temperature of the electric motor 34 through a temperature sensor disposed in a coil of the electric motor 34. The processor 12 may obtain the temperature of the electric control device 33 through a temperature sensor disposed near the electric control device 33.

For example, when the temperature of the electric motor 34 and the temperature of the electric control device 33 are both higher than a first temperature threshold, it is determined that the electric motor 34 and the electric control device 33 need to be cooled. This application does not restrict how to determine the cooling need of the electric motor 34 and the electric control device 33 according to the temperature of the electric motor 34 and the temperature of the electric control device 33.

A need for thermally managing such as heating or cooling the battery pack may be determined according to a temperature of the battery pack. The temperature of the battery pack may specifically be a temperature of a casing of the battery pack, or a temperature of air in an internal space of the battery pack, or a temperature of any cell in the battery pack, or an average temperature of a plurality of cells in the battery pack. This is not limited herein. For example, when the temperature of the battery pack is lower than a second temperature threshold, it is determined that the battery pack needs to be heated. When the temperature of the battery pack is higher than a third temperature threshold, it is determined that the battery pack needs to be cooled. A method for determining a need for heating or cooling the battery pack is not limited herein.

The following describes in detail a thermal management system 1 for a battery pack according to an embodiment of this application with reference to specific scenarios.

Scenario I: An electric vehicle is in a driving state, an electric motor 34 and an electric control device 33 need to be cooled, and a battery pack needs to be heated.

In this embodiment of this application, when the electric motor 34 and the electric control device 33 need to be cooled and the battery pack needs to be heated, a processor 12 controls a first solenoid valve 131, a fourth solenoid valve 134, and a fifth solenoid valve 135 to be in a closed state, controls a second solenoid valve 132 and a third solenoid valve 133 to be in an open state, and controls a second water pump 32 to be in a started state.

When the second solenoid valve 132 is in an open state, a passage between the electric motor 34 and a first heat exchanger 111 communicates. When the third solenoid valve 133 is in an open state, a passage between the first heat exchanger 111 and a cooler 31 communicates.

When a coolant flows through the electric control device 33 and the electric motor 34, the coolant absorbs heat generated by the electric control device 33 and/or the electric motor 34. The coolant that has absorbed the heat flows to the first heat exchanger 111 through the opened second solenoid valve 132. The first heat exchanger 111 transfers one part of the heat in the coolant to the battery pack to heat the battery pack. Then the coolant flows to the cooler 31 through the opened third solenoid valve 133. The cooler 31 transfers the other part of the heat to the air, so that a temperature of the coolant meets cooling requirements of the electric motor 34 and the electric control device 33.

In a loop in which the battery pack is heated by excess heat of the electric electric motor 34 and the electric control device 33, the coolant cyclically passes through the second water pump 32, the electric control device 33, the electric motor 34, the second solenoid valve 132, the first heat exchanger 111, the third solenoid valve 133, and the cooler 31 in sequence.

In other words, the first heat exchanger 111 in the thermal management device 11 for the battery pack absorbs the heat generated by the electric motor 34 and/or the electric control device 33, and transfers the heat to the battery pack to heat the battery pack.

In this embodiment of this application, the excess heat of the electric motor 34 and/or the electric control device 33 is recycled to heat the battery pack, thereby improving an energy recycling rate.

Scenario II: An electric vehicle is in a driving state, an electric motor 34 and an electric control device 33 need to be cooled, and a battery pack also needs to be cooled.

When the electric vehicle is in the driving state, the electric motor 34 and the electric control device 33 always need to be cooled. Therefore, a second water pump 32 and a cooler 31 always need to be started.

In a case that the battery pack also needs to be cooled, the processor 12 controls a second solenoid valve 132, a third solenoid valve 133, and a fourth solenoid valve 134 to be in a closed state, controls a first solenoid valve 131 and a fifth solenoid valve 135 to be in an open state, and controls a first water pump 113 and the second water pump 32 to be in a started state. In addition, the processor 12 starts up a second heat exchanger 112 and a first cooling system 114 to cool the battery pack.

Because the second solenoid valve 132, the third solenoid valve 133, and the fourth solenoid valve 134 are all in a closed state, the electric motor and control cooling system 3 and the thermal management system 1 for the battery pack do not communicate to each other, and are two independent systems. In the electric motor and control cooling system 3, the cooler 31 and the second water pump 32 are in a normal working state. Through the opened first solenoid valve 131, a coolant brings heat generated by the electric motor 34 and the electric control device 33 to the cooler 31. Then the cooler 31 transfers the heat in the coolant to an external environment, so as to cool the electric motor 34 and the electric control device 33.

In other words, the second water pump 32, the electric control device 33, the electric motor 34, the first solenoid valve 131, and the cooler 31 constitute a cooling loop for the electric motor 34 and the electric control device 33. Referring to FIG. 2, in the cooling loop for the electric motor 34 and the electric control device 33, the coolant passes through the second water pump 32, the electric control device 33, the electric motor 34, the first solenoid valve 131, and the cooler 31 in sequence. Therefore, a flow direction of the coolant is a clockwise direction.

To cool the battery pack in the thermal management system 1 for the battery pack, the first heat exchanger 111, the second heat exchanger 112, the first water pump 113, and the first cooling system 114 are all started. The heat generated by the battery pack is transferred to the coolant through the first heat exchanger 111. The coolant brings the heat generated by the battery pack to the second heat exchanger 112. The second heat exchanger 112 transfers the heat to the first cooling system 114. Then the first cooling system 114 transfers the heat to the external environment to cool the battery pack. The first cooling system 114 may be an air cooling system, a water cooling system, a refrigerant direct cooling system, or other cooling systems. The type of the first cooling system is not limited herein.

In other words, in a cooling loop of the battery pack, the coolant cyclically passes through the first water pump 113, the opened fifth solenoid valve 135, the first heat exchanger 111, and the second heat exchanger 112 in sequence. That is, the flow direction of the coolant is a counterclockwise direction.

Scenario III: An electric vehicle is in a driving state, an electric motor 34 and an electric control device 33 need to be cooled, and a battery pack does not need thermal management.

In a case that the electric motor 34 and the electric control device 33 need to be cooled but the battery pack needs neither cooling nor heating, the processor 12 controls a second solenoid valve 132, a third solenoid valve 133, and a fourth solenoid valve 134 to be in a closed state, controls a first solenoid valve 131 to be in an open state, controls a second water pump 32 to be in a started state, and controls a first water pump 113 to be in a shut-down state.

Because the second solenoid valve 132, the third solenoid valve 133, and the fourth solenoid valve 134 are all in a closed state, the thermal management system 1 for the battery pack and the electric motor and control cooling system 3 do not communicate to each other.

Because the first water pump 113 stops working and the first cooling system 114 stops working, the thermal management system 1 for the battery pack stops working. In other words, the thermal management system 1 for the battery pack neither heats the battery pack nor cools the battery pack.

Because the second water pump 32 is in a started state and the first solenoid valve 131 is in an open state, the electric motor and control cooling system 3 works normally as an independent system. With respect to principles of cooling the electric motor 34 and the electric control device 33 by the electric motor and control cooling system 3, refer to the description in Scenario II, and the principles are not be repeated here.

Scenario IV: An electric vehicle is in a parking state, an electric motor 34 and an electric control device 33 need to be cooled, and a battery pack needs to be heated.

In a case that the electric vehicle is in a parking state, if the battery pack needs to be heated, a self-heating system of the battery pack may be started. For example, the processor 12 may control the electric control device 33 to generate a continuous alternating excitation current in a high voltage circuit in which the battery pack is located. The alternating excitation current flows through the battery pack continuously to cause an internal resistor of the battery pack to generate heat, thereby heating the battery from inside and improving heating efficiency.

In the self-heating process, the electric motor 34 and the electric control device 33 also generate heat. Therefore, when the electric vehicle is in a parking state, if the battery pack needs to be heated but the electric motor 34 and the electric control device 33 need to be cooled, a processor 12 controls a first solenoid valve 131, a fourth solenoid valve 134, and a fifth solenoid valve 135 to be in a closed state, controls a second solenoid valve 132 and a third solenoid valve 133 to be in an open state, and controls a second water pump 32 to be in a started state.

A specific implementation of heating the battery pack by using the excess heat generated by the electric motor 34 and/or the electric control device 33, reference may be made to the description in Scenario I, and details are omitted here.

On the basis of the self-heating of the battery pack, the excess heat generated by the electric motor 34 and/or the electric control device 33 is recycled to further heat the battery pack.

An electric vehicle capable of self-heating a battery pack performs self-heating for the battery pack in a parking state. However, the thermal management system for the battery pack according to this application enables an electric vehicle capable of self-heating to heat the battery pack during driving by using the heat generated by the electric motor 34 and the electric control device 33, and is more widely applicable.

Scenario V: An electric vehicle is in a parking state, an electric motor 34 and an electric control device 33 does not need thermal management, and a battery pack needs to be cooled.

In this scenario, because the electric vehicle is in a parked state and the battery pack does not need to be heated, the electric motor 34 and the electric control device 33 do not work. That is, the electric motor and control cooling system 3 does not need thermal management.

In this scenario, a processor 12 controls a second solenoid valve 132, a third solenoid valve 133, and a fourth solenoid valve 134 to be in a closed state, controls a fifth solenoid valve 135 to be in an open state, controls a first water pump 113 to be in a started state, and controls a second water pump 32 to be in a shut-down state.

Because the second solenoid valve 132, the third solenoid valve 133, and the fourth solenoid valve 134 are all controlled to be in a closed state, the thermal management system 1 for the battery pack and the electric motor and control cooling system 3 do not communicate to each other. Because the second water pump 32 stops working and a cooler 31 is not started, the electric motor and control cooling system 3 stops working.

By starting the first water pump 113 and opening the fifth solenoid valve 135, the thermal management system for the battery pack can cool the battery pack.

With respect to the principles of cooling the battery pack by the thermal management system for the battery pack, reference may be made to the description in Scenario II above, and details are omitted here.

In this embodiment of this application, by controlling the operating status of the solenoid valve in the solenoid valve network 13, the thermal management system 1 for the battery pack can not only heat the battery pack by using the excess heat of the external cooling system 2, but also adapt to different thermal management requirements. The thermal management system 1 for the battery pack is widely applicable, and achieves higher operating efficiency.

Figure 3:
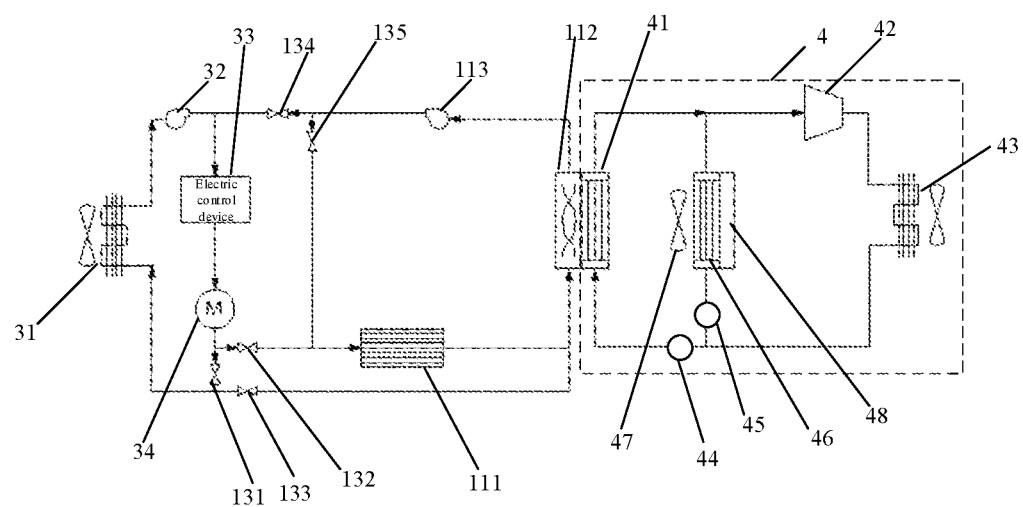
FIG. 3 is a schematic structural diagram of a thermal management system for an electric vehicle according to some embodiments of this application.

FIG. 3 shows a thermal management system for an electric vehicle according to an embodiment of this application. As shown in FIG. 3, the thermal management system for the electric vehicle includes a thermal management system 1 for a battery pack and an external cooling system 2 provided in an embodiment of this application.

For example, the external cooling system 2 may be an electric motor and control cooling system 3 shown in FIG. 2. Referring to the thermal management system 1 for the battery pack described above, a processor 12 recycles excess heat of an electric motor 34 and an electric control device 33 by controlling operating status of a solenoid valve in a solenoid valve network 13 and operating status of a second water pump 32, so as to heat the battery pack.

Therefore, an energy recycling rate is improved by integration of the thermal management system 1 for the battery pack and the electric motor and control cooling system 3.

In some embodiments, a first cooling system 114 in the thermal management system 1 for the battery pack is an air conditioner system 4. The air conditioner system 4 can not only cool the battery pack, but also cool a passenger compartment of the electric vehicle.

In other words, the thermal management system for the electric vehicle according to this embodiment of this application not only integrates the thermal management system 1 for the battery pack and the electric motor and control cooling system 3, but also integrates the thermal management system 1 for the battery pack and the air conditioner system 4.

Referring to FIG. 3, in some examples, the air conditioner system 4 includes: a first evaporator 41, a compressor 42, a condenser 43, a first expansion valve 44, a second expansion valve 45, a second evaporator 46, and a fan 47.

A first end of the first evaporator 41 is connected to a first end of the compressor 42 and a first end of the second evaporator 46, and the first evaporator 41 is connected to the second heat exchanger 112 and is configured to absorb heat transferred by the second heat exchanger 112, so as to cool the battery pack. A second end of the compressor 42 is connected to a first end of the condenser 43.

A second end of the condenser 43 is connected to a first valve port of the first expansion valve 44 and a first valve port of the second expansion valve 45. A second valve port of the first expansion valve 44 is connected to a second end of the first evaporator 41. A second valve port of the second expansion valve 45 is connected to a second end of the second evaporator 46.

The second evaporator 46 is configured to cool a passenger compartment of the electric vehicle. The fan 47 is configured to transfer cold air generated by the second evaporator 46 into the passenger compartment.

In this embodiment of this application, the air conditioner system 4 is integrated with the thermal management system 1 for the battery pack, so that the air conditioner system 4 and the thermal management system 1 for the battery pack can share key parts such as the compressor 42 and the condenser 43, thereby improving the degree of integration of the thermal management system for the entire electric vehicle, saving space, and reducing costs.

Similar to the five scenarios described above, when the thermal management requirement of the electric motor and control cooling system 3 is different from that of the thermal management system 1 for the battery pack in the electric vehicle, the thermal management requirements can be satisfied by controlling the operating status of the solenoid valve in the solenoid valve network 13 and the operating status of the first water pump 113 and the second water pump 32.

To cool the battery pack, the air conditioner system 4, the first heat exchanger 111, and the second heat exchanger 112 are all started. The heat generated by the battery pack is transferred to the coolant through the first heat exchanger 111. The coolant brings the heat generated by the battery pack to the second heat exchanger 112. The second heat exchanger 112 transfers the heat to the first evaporator 41 in the air conditioner system 4. The first evaporator 41, the compressor 42, the condenser 43, and the first expansion valve 44 form a circulation loop, and this circulation loop cools the battery pack.

In addition, if the passenger compartment of the electric vehicle needs to be cooled, the second evaporator 46, the compressor 42, the condenser 43, and the second expansion valve 45 form a circulation loop, and this circulation loop is configured to cool the passenger compartment of the electric vehicle.

Therefore, in this embodiment of this application, the air conditioner system 4 can not only cool the passenger compartment, but also cool the battery pack through the second heat exchanger 112 in the thermal management system for the battery pack.

Table 1 shows control methods corresponding to different thermal management requirements of the electric motor and control cooling system 3 and the thermal management system for the battery pack.

TABLE 1

| Driving/ parking | Thermal management requirement of the electric control device 33 | Thermal management requirement of the electric motor 34 | Thermal management requirement of the battery pack | System control method |
| --- | --- | --- | --- | --- |
| Driving | Cooling | Cooling | Cooling | Close the second solenoid valve 132, the third solenoid valve 133, and the fourth solenoid valve 134, and open the first solenoid valve 131 and the fifth solenoid valve 135. The electric motor and control cooling system 3 and the cooling system for the battery pack perform cooling separately. |
| Driving | Cooling | Cooling | Heating | Close the first solenoid valve 131, the fourth solenoid valve 134, and the fifth solenoid valve 135, and open the second solenoid valve 132 and the third solenoid valve 133. Heat the battery pack by using the heat recycled after the coolant flows through the electric control device 33 and the electric motor 34. |
| Driving | Cooling | Cooling | Neither cooling nor heating | Close the second solenoid valve 132, the third solenoid valve 133, and the fourth solenoid valve 134, and open the first solenoid valve 131. |
| Parking | Cooling | Cooling | Heating | Close the second solenoid valve 132, the third solenoid valve 133, and the fourth solenoid valve 134, and open the first solenoid valve 131 and the fifth solenoid valve 135. Heat the battery pack by using a self-heating technology. Heat the battery pack by using the heat recycled after the coolant flows through the electric control device 33 and the electric motor 34. |
| Parking | No cooling | No cooling | Cooling | Close the second solenoid valve 132, the third solenoid valve 133, and the fourth solenoid valve 134, and open the fifth solenoid valve 135. |

In some embodiments, the air conditioner system 4 further includes a heater 48. The heater 48 is configured to heat the passenger compartment. The fan 47 is configured to transfer the heat generated by the heater 48 into the passenger compartment.

In this embodiment of this application, the thermal management system 1 for the battery pack, the electric motor and control cooling system 3, and the air conditioner system 4 are integrated together, so that not only the energy utilization rate is increased, but also the operating efficiency of the thermal management system for the electric vehicle is improved, and manufacturing costs of the thermal management system for the electric vehicle is reduced.

In some embodiments of this application, in Scenario I, a power of the second water pump 32 is P1 in a case that the first solenoid valve 131, the fourth solenoid valve 134, and the fifth solenoid valve 135 are all in a closed state, and the second solenoid valve 132 and the third solenoid valve 133 are both in an open state;

in Scenario II, the power of the second water pump 32 is P2 in a case that the second solenoid valve 132, the third solenoid valve 133, and the fourth solenoid valve 134 are all in a closed state, and the first solenoid valve 131 and the fifth solenoid valve 135 are both in an open state; then P1 is greater than P2 assuming that a flow speed of the coolant in Scenario I is the same as that in Scenario II.

The power of the second water pump 32 decides the flow speed of the coolant and, in Scenario I, the coolant has a relatively high flow resistance due to a need of flowing through the first heat exchanger 111 in the thermal management system 1 for the battery pack. Therefore, the power of the second water pump 32 needs to be increased to ensure that the coolant can flow at a specific flow speed and ensure that the excess heat of the electric control device 33 and the electric motor 34 can heat the battery pack. However, in Scenario II, the coolant merely needs to cool the electric motor 34 and the electric control device 33. As compared with Scenario I, the flow resistance of the coolant is relatively low. Therefore, P2 is less than P1 assuming that the flow speed of the coolant in Scenario I is the same as that in Scenario II.

In other words, the power of the second water pump 32 is adjustable at a minimum of two levels. When the coolant is merely used to cool the electric motor 34 and the electric control device 33, the second water pump 32 is in a normal operating state. When the coolant needs to flow through the battery pack, the second water pump 32 is in a high-power operating state.

In some embodiments of this application, the thermal management system for the electric vehicle further includes a first temperature sensor (not shown in the drawing) connected to the processor 12 and configured to collect the temperature of the electric motor 34.

The first temperature sensor is disposed inside a coil of the electric motor 34 and is configured to collect the temperature of the electric motor 34. The processor 12 is configured to adjust a rotation speed of the fan in the cooler 31 according to the temperature of the electric motor 34.

When the electric motor and control cooling system 3 is working normally, the processor 12 can adjust the rotation speed of the fan in the cooler 31 according to the temperature of the electric motor 34, thereby adjusting a cooling speed for the electric control device 33 and the electric motor 34.

In some examples, the processor 12 adjusts the rotation speed of the fan in the cooler 31 according to the temperature of the electric motor 34 and a preset correspondence between a temperature interval and the rotation speed of the fan in the cooler 31. In the correspondence between the temperature interval and the rotation speed, the higher the temperature corresponding to the temperature interval, the higher the rotation speed corresponding to the temperature interval. As an example, Table 2 shows a correspondence between the temperature interval and the rotation speed.

TABLE 2

| Vehicle status | Thermal management system status | Temperature of the electric motor 34 | Ratio of the rotation speed of the fan in the cooler 31 to the maximum rotation speed |
|---|---|---|---|
| Driving | The electric motor and control cooling system 3 is working normally | <50° C. | 20% |
| Driving | The electric motor and control cooling system 3 is working normally | 50° C.~60° C. | 50% |
| Driving | The electric motor and control cooling system 3 is working normally | 60° C.~70° C. | 100% |

When the temperature of the electric motor 34 is in a first temperature interval, that is, the temperature of the electric motor 34 is lower than 50° C., the rotation speed of the fan in the cooler 31 is adjusted to 20% of the maximum rotation speed.

When the temperature of the electric motor 34 is in a second temperature interval, that is, the temperature of the electric motor 34 is 50° C.~60° C., the rotation speed of the fan in the cooler 31 is adjusted to 50% of the maximum rotation speed.

When the temperature of the electric motor 34 is in a third temperature interval, that is, the temperature of the electric motor 34 is 60° C.~70° C., the rotation speed of the fan in the cooler 31 is adjusted to the maximum rotation speed.

In other words, when the temperature of the electric motor 34 is higher, the rotation speed of the fan in the cooler 31 will be higher, so that the electric motor 34 can be quickly cooled.

In some embodiments of this application, temperature sensors may be disposed at both an inlet and an outlet of the cooler 31. In this way, the processor 12 adjusts the rotation speed of the fan in the cooler 31 according to the temperature at the inlet of the cooler 31 and the temperature at the outlet of the cooler 31, thereby adjusting the cooling speed for the electric motor 34 and the electric control device 33.

In other embodiments of this application, a temperature sensor may be further disposed near the electric control device 33 to adjust the rotation speed of the fan in the cooler 31 according to the temperature of the electric control device 33.

In some embodiments of this application, the thermal management system for the electric vehicle further includes a second temperature sensor (not shown in the drawing), a third temperature sensor (not shown in the drawing), and a fourth temperature sensor (not shown in the drawing). The second temperature sensor is connected to the processor 12, and is configured to collect a temperature of a first port of the first heat exchanger 111. The second temperature sensor is connected to the processor 12, and is configured to collect a temperature of a second port of the first heat exchanger 111. The first port of the first heat exchanger 111 is an inlet of the first heat exchanger 111, and the second port of the first heat exchanger 111 is an outlet of the first heat exchanger 111. The fourth temperature sensor is connected to the processor 12, and is configured to collect a temperature of the battery pack.

In a scenario in which the battery pack is heated by the excess heat of the electric motor 34 and the electric control device 33, the processor 12 adjusts the power of the second water pump 32 according the temperature of the inlet of the first heat exchanger 111, the temperature of the outlet of the first heat exchanger 111, and the temperature of the battery pack.

Specifically, the processor 12 adjusts the power of the second water pump 32 according to a temperature difference between the temperature of the inlet of the first heat exchanger 111 and the temperature of the outlet of the first heat exchanger 111, the temperature of the battery pack, and a preset correspondence between the power of the second water pump 32 and the temperature of the battery pack and an inlet-outlet temperature difference of the first heat exchanger 111. As an example, Table 3 shows a correspondence between the power of the second water pump 32 and the temperature of the battery pack and the inlet-outlet temperature difference of the first heat exchanger 111.

When the temperature of the battery pack is 0° C.~7° C., if the inlet-outlet temperature difference of the first heat exchanger 111 is greater than 5° C., the power of the second water pump 32 is adjusted to the maximum power. If the inlet-outlet temperature difference of the first heat exchanger 111 is greater than 5° C., it indicates deficiency of an exchange capacity of the coolant and indicates a need to increase a flow volume of the coolant. Therefore, the power of the second water pump 32 needs to be adjusted to the maximum power to heat the battery pack quickly.

When the temperature of the battery pack is 0° C.~7° C., if the inlet-outlet temperature difference of the first heat exchanger 111 is less than 5° C., the power of the second water pump 32 is adjusted to a half of the maximum power. If the inlet-outlet temperature difference of the first heat exchanger 111 is less than 5° C., it indicates that a sufficient heat exchange capacity of the coolant, and an appropriate reduction of the flow volume of the coolant can meet the requirement for heating the battery pack. To avoid waste of resources, the power of the second water pump 32 may be appropriately reduced. For example, the power of the second water pump 32 is reduced to a half of the maximum power.

In some embodiments of this application, a temperature sensor may be further disposed at the inlet and outlet of the second heat exchanger 112 to collect the temperature of the inlet of the second heat exchanger 112 and the temperature of the outlet of the second heat exchanger 112. In this way, the processor 12 can control a flow volume of a refrigerant in the air conditioner system 4 according to the inlet-outlet temperature difference of the second heat exchanger 112, so as to adjust a cooling speed for the battery pack. Specifically, the processor 12 may control at least one control parameter in the air conditioner system 4 to adjust the flow volume of the refrigerant. The control parameter in the air conditioner system 4 includes an opening degree of the first expansion valve 44, an opening degree of the second expansion valve 45, a rotation speed of the compressor 32, a fan rotation speed of the condenser 33, and the like.

TABLE 3

| Vehicle status | Thermal management system status | Temperature of the battery pack | Inlet-outlet temperature difference of the first heat exchanger 111 | Power of the second water pump 32 |
|---|---|---|---|---|
| Driving | The battery pack is heated by excess heat of the electric motor 34 and the electric control device 33 | −10° C.~0° C. | >5° C. | 100% |
| Driving | The battery pack is heated by excess heat of the electric motor 34 and the electric control device 33 | −10° C.~0° C. | <5° C. | 100% |
| Driving | The battery pack is heated by excess heat of the electric motor 34 and the electric control device 33 | 0° C.~7° C. | >5° C. | 100% |
| Driving | The battery pack is heated by excess heat of the electric motor 34 and the electric control device 33 | 0° C.~7° C. | <5° C. | 50% |

Referring to Table 2, if the temperature of the battery pack is within −10° C.~0° C., the power of the second water pump 32 is adjusted to the maximum power no matter whether the inlet-outlet temperature difference of the first heat exchanger 111 is greater than 5° C. or less than 5° C.

In other words, if the temperature of the battery pack is relatively low, the power of the second water pump 32 is adjusted to the maximum power to heat the battery pack as soon as practicable by using the excess heat of the electric motor 34 and the electric control device 33.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A thermal management system for a battery pack of an electric vehicle, comprising:
a thermal management device (11) for the battery pack, a processor (12), a solenoid valve network (13) connected to the thermal management device (11) for the battery pack, and an external cooling system (2); characterized in that
the thermal management device (11) for the battery pack comprises:
a first heat exchanger (111), wherein a first end of the first heat exchanger (111) is connected to the second valve port of the second solenoid valve (132), and a second end of the first heat exchanger (111) is connected to a first end of a second heat exchanger (112) and the second valve port of the third solenoid valve (133);
the second heat exchanger (112), wherein a second end of the second heat exchanger (112) is connected to a first end of a first water pump (113);
the first water pump (113), wherein a second end of the first water pump (113) is connected to the second valve port of the fourth solenoid valve (134); and
a first cooling system (114), wherein the first cooling system (114) is connected to the second heat exchanger (112) and is configured to absorb heat transferred by the second heat exchanger (112), so as to cool the battery pack;
the thermal management system further comprises an external port of the solenoid valve network (13) is connected to the external cooling system (2);
wherein the solenoid valve network (13) comprises:
a first solenoid valve (131), wherein a first valve port of the first solenoid valve (131) and a second valve port of the first solenoid valve (131) are both connected to the external cooling system (2);
a second solenoid valve (132), wherein a first valve port of the second solenoid valve (132) is connected to the first valve port of the first solenoid valve (131), and a second valve port of the second solenoid valve (132) is connected to a thermal management module for the battery pack;
a third solenoid valve (133), wherein a first valve port of the third solenoid valve (133) is connected to the second valve port of the first solenoid valve (131), and a second valve port of the third solenoid valve (133) is connected to the thermal management module for the battery pack;
a fourth solenoid valve (134), wherein a first valve port of the fourth solenoid valve (134) is connected to the external cooling system (2), and a second valve port of the fourth solenoid valve (134) is connected to a first valve port of a fifth solenoid valve (135) and the thermal management module for the battery pack; and
the fifth solenoid valve (135), wherein a second valve port of the fifth solenoid valve (135) is connected to the second valve port of the second solenoid valve (132), wherein
the external port comprises the first valve port of the first solenoid valve (131), the second valve port of the first solenoid valve (131), and the first valve port of the fourth solenoid valve (134);
the external cooling system (2) is an electric motor and control cooling system (3), and the electric motor and control cooling system (3) comprises a cooler (31), a second water pump (32), an electric control device (33), and an electric motor (34);

the first valve port of the first solenoid valve (131) is connected to a first end of the electric motor (34), and a second end of the electric motor (34) is connected to a first end of the electric control device (33);
the second valve port of the first solenoid valve (131) is connected to an inlet of the cooler (31), and an outlet of the cooler (31) is connected to a first end of the second water pump (32); and
the first valve port of the fourth solenoid valve (134) is connected to a second end of the second water pump (32) and a second end of the electric control device (33); and
under a condition that the electric motor (34) and the electric control device (33) need to be cooled and the battery pack needs to be heated, the processor (12) is configured to control the first solenoid valve (131), the fourth solenoid valve (134), and the fifth solenoid valve (135) to be in a closed state, control the second solenoid valve (132) and the third solenoid valve (133) to be in an open state, and control the second water pump (32) to be in a started state.

2. The system according to claim 1, wherein under a condition that the electric vehicle is in a driving state, the electric motor (34) and the electric control device (33) need to be cooled and the battery pack also needs to be cooled, the processor (12) is configured to control the second solenoid valve (132), the third solenoid valve (133), and the fourth solenoid valve (134) to be in a closed state, control the first solenoid valve (131) and the fifth solenoid valve (135) to be in an open state, and control the first water pump (113) and the second water pump (32) to be in a started state.

3. The system according to claim 1, wherein under a condition that the electric vehicle is in a driving state, the electric motor (34) and the electric control device (33) need to be cooled and the battery pack does not need thermal management, the processor (12) is configured to control the second solenoid valve (132), the third solenoid valve (133), and the fourth solenoid valve (134) to be in a closed state, control the first solenoid valve (131) to be in an open state, and control the second water pump (32) to be in a started state.

4. The system according to claim 1, wherein under a condition that the electric vehicle is in a parking state, the electric motor (34) and the electric control device (33) do not need thermal management and the battery pack needs to be cooled, the processor (12) is configured to control the second solenoid valve (132), the third solenoid valve (133), and the fourth solenoid valve (134) to be in a closed state, control the fifth solenoid valve (135) to be in an open state, and control the first water pump (113) to be in a started state.

5. The system according to claim 1,
wherein the first cooling system (114) is an air conditioner system (4), and is further configured to cool a passenger compartment of the electric vehicle, wherein the air conditioner system (4) comprises:
a first evaporator (41), wherein a first end of the first evaporator (41) is connected to a first end of a compressor (42) and a first end of a second evaporator (46), and the first evaporator (41) is connected to the second heat exchanger (112) and is configured to absorb heat transferred by the second heat exchanger (112), so as to cool the battery pack;
the compressor (42), wherein a second end of the compressor (42) is connected to a first end of a condenser (43);

the condenser (43), wherein a second end of the condenser (43) is connected to a first valve port of a first expansion valve (44) and a first valve port of a second expansion valve (45);

the first expansion valve (44), wherein a second valve port of the first expansion valve (44) is connected to a second end of the first evaporator (41);

the second expansion valve (45), wherein a second valve port of the second expansion valve (45) is connected to a second end of the second evaporator (46);

the second evaporator (46), configured to cool the passenger compartment of the electric vehicle; and a fan (47), configured to transfer cold air generated by the second evaporator (46) into the passenger compartment.

6. The system according to claim 5, wherein the air conditioner system (4) further comprises a heater (48), configured to heat the passenger compartment; and the fan (47) is further configured to transfer heat generated by the heater (48) into the passenger compartment.

7. The system according to claim 5, wherein a power of the second water pump (32) is P1 and a flow speed of a coolant is V1 in a case that the first solenoid valve (131), the fourth solenoid valve (134), and the fifth solenoid valve (135) are all in a closed state, and the second solenoid valve (132) and the third solenoid valve (133) are both in an open state;

the power of the second water pump (32) is P2 and the flow speed of the coolant is V1 in a case that the second solenoid valve (132), the third solenoid valve (133), and the fourth solenoid valve (134) are all in a closed state, and the first solenoid valve (131) and the fifth solenoid valve (135) are both in an open state; and P1 is greater than P2.

8. The system according to claim 7, wherein the system further comprises:

a first temperature sensor, connected to the processor (12), and configured to collect a temperature of the electric motor (34); and the processor (12) is configured to adjust a rotation speed of the fan (47) in the cooler (31) according to the temperature of the electric motor (34).

9. The system according to claim 7, wherein the system further comprises:

a second temperature sensor, connected to a processor (12), and configured to collect a temperature of a first port of the first heat exchanger (111);

a third temperature sensor, connected to the processor (12), and configured to collect a temperature of a second port of the first heat exchanger (111); and a fourth temperature sensor, connected to the processor (12), and configured to collect a temperature of the battery pack, wherein the processor (12) is configured to adjust the power of the second water pump (32) according to the temperature of the first port of the first heat exchanger (111), the temperature of the second port of the first heat exchanger (111), and the temperature of the battery pack.

* * * * *